(12) United States Patent
Purcell et al.

(10) Patent No.: US 8,806,620 B2
(45) Date of Patent: Aug. 12, 2014

(54) METHOD AND DEVICE FOR MANAGING SECURITY EVENTS

(75) Inventors: Stacy P. Purcell, Orangevale, CA (US); Alan D. Ross, Shingle Springs, CA (US); Jim S. Baca, Corrales, NM (US); Selim Aissi, Beaverton, OR (US); Tobias M. Kohlenberg, Portland, OR (US); Dennis M. Morgan, Pine Grove, CA (US)

(73) Assignee: Intel Corporation, Santa Clara, CA (US)

( * ) Notice: Subject to any disclaimer, the term of this patent is extended or adjusted under 35 U.S.C. 154(b) by 852 days.

(21) Appl. No.: 12/647,447

(22) Filed: Dec. 26, 2009

(65) Prior Publication Data

US 2011/0161848 A1 Jun. 30, 2011

(51) Int. Cl.
*H04L 29/06* (2006.01)
(52) U.S. Cl.
USPC .......................................................... 726/22
(58) Field of Classification Search
None
See application file for complete search history.

(56) References Cited

U.S. PATENT DOCUMENTS

| | | | | |
|---|---|---|---|---|
| 7,171,689 B2* | 1/2007 | Beavers | | 726/22 |
| 7,207,039 B2 | 4/2007 | Komarla et al. | | |
| 7,293,287 B2* | 11/2007 | Fischman et al. | | 726/22 |
| 7,376,969 B1* | 5/2008 | Njemanze et al. | | 726/22 |
| 7,472,422 B1* | 12/2008 | Agbabian | | 726/25 |
| 7,607,169 B1 | 10/2009 | Njemanze et al. | | |
| 7,974,416 B2 | 7/2011 | Zimmer et al. | | |
| 2003/0027551 A1* | 2/2003 | Rockwell | | 455/410 |
| 2003/0167406 A1 | 9/2003 | Beavers | | |
| 2004/0054896 A1 | 3/2004 | Himmel et al. | | |
| 2004/0193912 A1 | 9/2004 | Li et al. | | |
| 2005/0003804 A1* | 1/2005 | Huomo et al. | | 455/414.1 |
| 2005/0183143 A1* | 8/2005 | Anderholm et al. | | 726/22 |
| 2006/0224742 A1 | 10/2006 | Shahbazi | | |
| 2007/0113270 A1* | 5/2007 | Kraemer et al. | | 726/4 |
| 2008/0034425 A1* | 2/2008 | Overcash et al. | | 726/22 |
| 2008/0307525 A1* | 12/2008 | Nickle | | 726/22 |
| 2009/0126014 A1* | 5/2009 | Brady et al. | | 726/22 |
| 2009/0222876 A1* | 9/2009 | Goldberg et al. | | 726/1 |
| 2011/0078758 A1* | 3/2011 | Kohlenberg et al. | | 726/1 |

FOREIGN PATENT DOCUMENTS

| | | | | |
|---|---|---|---|---|
| EP | 1701500 A1 | 9/2006 | | |
| KR | 1020020062070 A | 7/2002 | | |
| KR | 10-0351306 B1 | 9/2002 | | |
| WO | WO 2004021114 A3 * | 5/2004 | ............... | H04L 9/00 |
| WO | 2004066085 A2 | 8/2004 | | |
| WO | 2008046807 A1 | 4/2008 | | |

OTHER PUBLICATIONS

Mehdizadeh, Yahya, "IT Security Event Management", Jun. 2004, CISSP, GSEC, p. iii-14.*

(Continued)

*Primary Examiner* — Jason K. Gee
*Assistant Examiner* — Maung Lwin
(74) *Attorney, Agent, or Firm* — Barnes & Thornburg LLP

(57) ABSTRACT

A method and device for managing security events includes establishing a security event manager on a mobile computing device. The security event manager may be embodied as software and/or hardware components. The security event manager receives security event data from a plurality of security event sources of the mobile computing device and correlates the security event data based on a security policy to determine whether a security event has occurred. The security event manager responds to the security event based on the security policy.

22 Claims, 4 Drawing Sheets

(56) References Cited

OTHER PUBLICATIONS

Office Action received for Korean Patent App. No. 10-2010-135036, mailed Jun. 20, 2012, 5 pages of Korean Office Action and 4 pages of unofficial English translation.

Extended European Search Report and Written Opinion dated Apr. 20, 2011 for EP App. No. 10252200.0-2212, 8 pages.

Mehdizadeh, "IT Security Event Management," White Paper, May 2004, 14 pages.

Long et al., "The Technology and Practice of Comprehensive Information Security Management for Wireless Mobile Environment," WiCom '09, 5th International Conference on Wireless Communications, Networking and Mobile Computing, Sep. 2009, pp. 1-4, ISBN 978-1-4244-3692-7.

Denning, "An Intrusion-Detection Model," IEEE Transactions on Software Engineering, Feb. 1987, pp. 222-232, vol. SE-13, issue 2, ISSN: 0098-5589.

Kansal et al., "Building a Sensor Network of Mobile Phones," IPSN'07, Apr. 25, 2007, 2 pages.

"The All New 2010 Intel Core vPro Processor Family: Intelligence that Adapts to Your Needs," available at http://download.intel.com/products/vpro/whitepaper/crossclient.pdf, 2010, 28 pgs., USA.

"Architecture Guide: Intel Active Management Technology," Architecture Guide: Intel Active Management Technology—Intel Software Network, available at http://software.intel.com/en-us/articles/architecture-guide-intel-active-management-technology/, accessed May 9, 2010, 18 pgs.

"Intel Active Management Technology," Wikipedia, the free encyclopedia, available at http://en.wikipedia.org/wiki/Intel_Active_Management_Technology, accessed May 9, 2010, 10 pgs.

"Intel vPro," Wikipedia, the free encyclopedia, available at http://en.wikipedia.org/wiki/Intel_vPro, accessed May 9, 2010, 8 pgs.

"Intel Active Management Technology Setup and Configuration Service Version 5.0—Console User's Guide," available at http://cache-www.intel.com/cd/00/00/32/09/320963_320963.pdf, Jul. 9, 2008, 163 pgs.

"Role-based access control," Wikipedia, the free encyclopedia, available at http://en.wikipedia.org/wiki/Role_based_access_control, accessed May 9, 2010, 4 pgs.

"Intel Atom," Wikipedia, the free encyclopedia, available at http://en.wikipedia.org/wiki/Atom-intel, accessed May 9, 2010, 9 pgs.

"Mobile Internet device," Wikipedia, the free encyclopedia, available at http://en.wikipedia.org/wiki/Mobile_internet_device, accessed May 9, 2010, 4 pgs.

"Security information management," Wikipedia, the free encyclopedia, available at http://en.wikipedia.org/wiki/Security_information_management, accessed May 9, 2010, 1 pg.

"Security event manager," Wikipedia, the free encyclopedia, available at http://en.wikipedia.org/wiki/Security_event_manager, accessed May 9, 2010, 2 pgs.

"Trusted Platform Module," Wikipedia, the free encyclopedia, available at http://en.wikipedia.org/wiki/Trusted_Platform_Module, accessed May 9, 2010, 4 pgs.

Office Action received in Japanese Patent Application No. 2010-282624, mailed Dec. 4, 2012, 9 pages of Office Action, including 5 pages of English translation.

Office Action received in Korean Patent Application No. 10-2010-35036, mailed Dec. 21, 2012, 5 pages of Office Action, including 2 pages of English translation.

Office Action received for Chinese Patent Application No. 201010625142.9, mailed Mar. 29, 2013, 7 pages of Chinese Office Action and 15 pages of unofficial English translation.

Office Action received for Korean Patent Application No. 10-2013-31095, mailed on May 29, 2013, 9 pages of office action including 4 pages of unofficial English translation.

Office Action received for Chinese Patent Application No. 201010625142.9, mailed on Dec. 25, 2013, 7 pages of Chinese Office Action and 13 pages of unofficial English translation.

\* cited by examiner

METHOD AND DEVICE FOR MANAGING SECURITY EVENTS

BACKGROUND

Security Event Management (SEM) and Security Information Management (SIM) systems are typically enterprise-level servers configured to collect, aggregate, and correlate security event data from multiple security event sources. In a standard SEM/SIM system, user's client computers are configured to transmit reports, logs, and other security-related data to the SEM/SIM server periodically. The SEM/SIM server aggregates and correlates the security data received from the client computers and other enterprise devices and sources, such as network routers, firewalls, and services, to generate a report of security events. Typically, the SEM/SIM servers are passive and do not automatically respond to the security events. Rather, security personnel may review the report of security events and take appropriate action.

Historically, the security perimeter of an enterprise correlated to the physical perimeter of that enterprise (i.e., the building in which the enterprise was located) because the majority of computing devices were stationary. However, as computing devices become ever more mobile, the enterprise security perimeter is expanding or, in some cases, vanishing entirely. As such, centrally located security systems, such as traditional SEM/SIM servers, struggle to maintain security over the enterprise as a whole and, particularly, over the large number of mobile computing devices.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
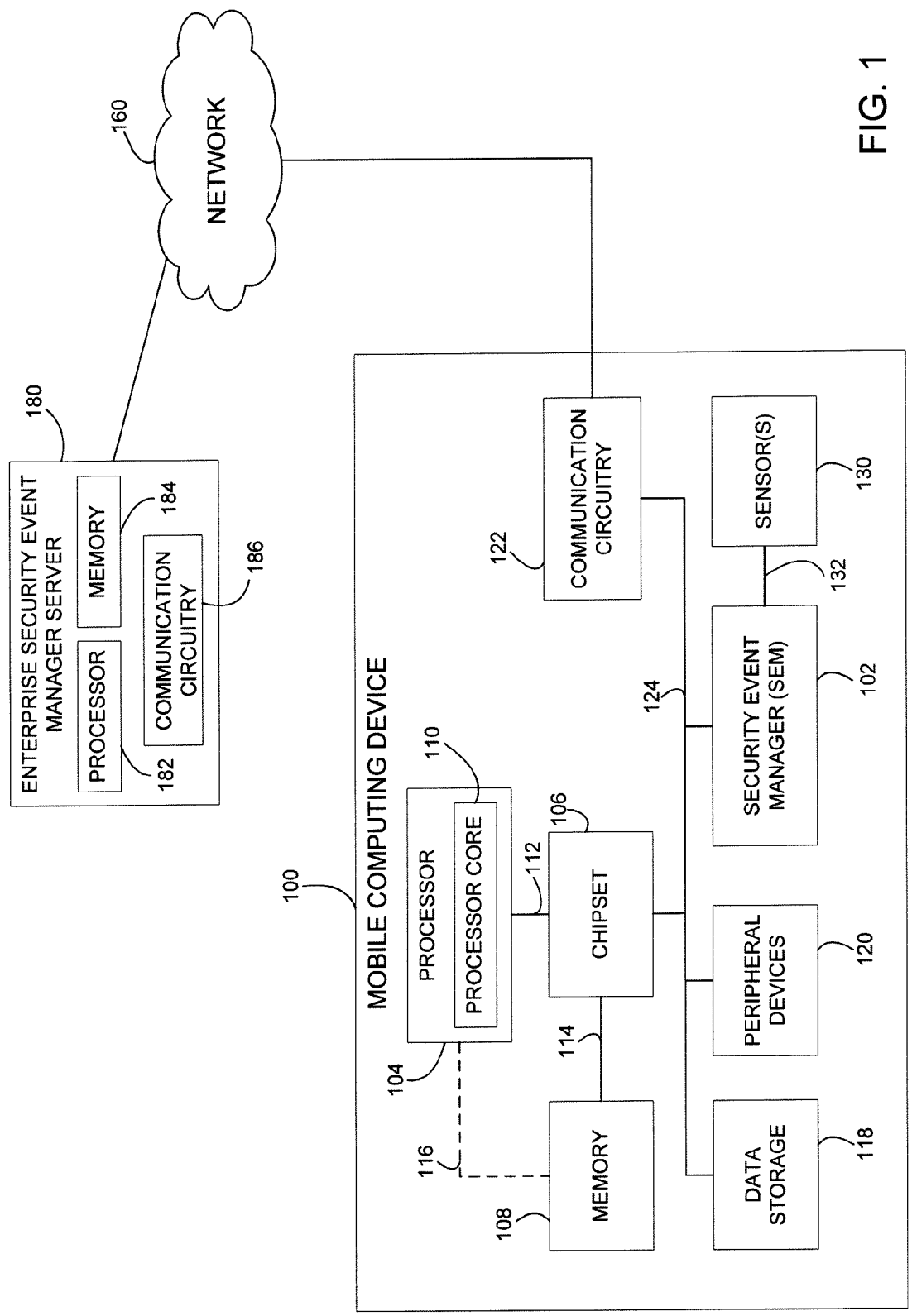
FIG. 1 is a simplified block diagram of one embodiment of a mobile computing device for managing security events generated on the mobile computing device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices may be set forth in order to provide a more thorough understanding of the present disclosure. It will be appreciated, however, by one skilled in the art that embodiments of the disclosure may be practiced without such specific details. In other instances, control structures, gate level circuits and full software instruction sequences may have not been shown in detail in order not to obscure the disclosure. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure may be implemented in hardware, firmware, microcode, Central Processing Unit (CPU) instructions, software, or any combination thereof. Embodiments of the disclosure implemented in a computer system may include one or more bus-based interconnects between components and/or one or more point-to-point interconnects between components. Embodiments of the invention may also be implemented as instructions stored on a machine-readable, tangible medium, which may be read and executed by one or more processors. A machine-readable, tangible medium may include any tangible mechanism for storing or transmitting information in a form readable by a machine (e.g., a computing device). For example, a machine-readable, tangible medium may include read only memory (ROM); random access memory (RAM); magnetic disk storage media; optical storage media; flash memory devices; and other tangible mediums.

Referring now to FIG. 1, a mobile computing device 100 configured to manage security events generated on the device 100 includes a security event manager (SEM) 102, a processor 104, a chipset 106, and memory 108. The computing device 100 may be embodied as any type of portable computing device capable of performing the functions described herein. For example, in some embodiments, the computing device 100 is embodied as a cellular phone, a personal data assistant, a handheld computer, a laptop computer, a mobile internet device (MID), or other computer-based mobile device.

The security event manager 102 may be embodied as a plurality of components including hardware components, firmware components, and software components that interact cooperatively to collect, normalize, aggregate, correlate, and respond to security events generated on the mobile computing device 100 as discussed in more detail herein. As such, the security event manager 102 may include a dedicated hardware processor and/or other circuitry separate from the processor 104 of the device 100. Additionally, the security event manager 102 may include firmware instructions configured to initialize or otherwise "boot" the security event manager 102 in a secured environment. In some embodiments, the security event manager 102 may include or otherwise be communicatively coupled to memory (not shown) separate from the main memory 108 for increased security.

The processor 104 is illustratively embodied as a single core processor having a processor core 110. However, in other embodiments, the processor 104 may be embodied as a multi-core processor having multiple processor cores 110. Additionally, the computing device 100 may include additional processors 104 having one or more processor cores 110. The processor 104 is communicatively coupled to the chipset 106 via a number of signal paths 112. The signal paths 112 may be embodied as any type of signal paths capable of facilitating communication between the processor 104 and the chipset 106. For example, the signal paths 112 may be embodied as any number of wires, printed circuit board traces, vias, buses, intervening devices, and/or the like.

The memory 108 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), and/or other volatile memory devices. Additionally, although only a single memory device 108 is illustrated in FIG. 1, in other embodiments, the computing device 100 may include additional memory devices 108.

The chipset 106 may include a memory controller hub (MCH) or northbridge, an input/output controller hub (ICH) or southbridge, and a firmware device. In such embodiments, the firmware device may be embodied as a memory storage device for storing Basic Input/Output System (BIOS) data and/or instructions and/or other information. The chipset 106 is communicatively coupled to the memory 108 via a number of signal paths 114. Similar to the signal paths 112, the signal paths 114 may be embodied as any type of signal paths capable of facilitating communication between the chipset 106 and the memory device 108 such as, for example, any number of bus paths, printed circuit board traces, wires, vias, intervening devices, and/or other interconnects.

In other embodiments, the chipset 106 may be embodied as a platform controller hub (PCH). In such embodiments, the memory controller hub (MCH) may be incorporated in or otherwise associated with the processor 104. Additionally, in such embodiments, the memory 108 may be communicatively coupled to the processor 104, rather than the chipset 106 (i.e., the platform controller hub), via a number of signal paths 116. Similar to the signal paths 112, the signal paths 116 may be embodied as any type of signal paths capable of facilitating communication between the memory device 108 and the processor 104 such as, for example, any number of bus paths, printed circuit board traces, wires, vias, intervening devices, and/or other interconnects.

Additionally, in yet other embodiments, two or more components of the computing device 100 may be incorporated together in a single integrated circuit. For example, in some embodiments, the processor 104, the memory controller hub (MCH), the input/output controller hub (ICH), portions of the memory 108, and/or other components of the device 100 may be incorporated in a system-on-a-chip (SoC) integrated circuit. Additionally or alternatively, a subset of such components may be incorporated together on a system-in-a-package (SiP) integrated circuit or the like. As such, it should be appreciated that the particular physical layout of the computing device 100 is not restricted to the illustrative embodiment of FIG. 1.

In some embodiments, the computing device 100 may include a data storage device(s) 118, one or more peripheral devices 120, and communication circuitry 122. In such embodiments, the chipset 106 is also communicatively coupled to the data storage device(s) 118, the peripheral devices 120, the communication circuitry 122, and the security event manager 102 via signal paths 124. Again, similar to the signal paths 112, the signal paths 124 may be embodied as any type of signal paths capable of facilitating communication between the chipset 106 and the data storage device(s) 118, peripheral devices 120, communication circuitry 122, and the security event manager 102 such as, for example, any number of wires, printed circuit board traces, vias, buses, intervening devices, and/or the like.

The data storage device(s) 118 may be embodied as any number and type of devices configured for the short-term or long-term storage of data such as, for example, memory devices and circuits, memory cards, hard disk drives, solid-state drives, or other data storage devices. The peripheral devices 120 may include any number of peripheral devices including input devices, output devices, and other interface devices. For example, the peripheral devices 120 may include a display screen and keyboard of the mobile computing device 100. The particular devices included in the peripheral devices 120 may depend upon, for example, the intended use of the computing device.

The communication circuitry 122 may be embodied as any number of devices and circuitry for enabling communications between the mobile computing device 100 and one or more remote devices. For example, the communication circuitry 122 may include one or more wired or wireless network interfaces to facilitate wired or wireless communications with an enterprise security event management (SEM) server 180 over a network 160. The network 160 may be embodied as any type of wired and/or wireless network such as a local area network, a wide area network, a publicly available global network (e.g., the Internet), or other network. Additionally, the network 160 may include any number of additional devices to facilitate the communication between the mobile computing device 100 and the enterprise security event management server 180 such as routers, switches, intervening computers, and the like.

In some embodiments, the mobile computing device 100 may also include one or more sensors 130 communicatively coupled to the security event manager 102 via signal paths 132. Similar to the signal paths 112, the signal paths 132 may be embodied as any type of signal paths capable of facilitating communication between the sensors 130 and the security event manager 102. The sensors 130 may be embodied as any type of sensor or sensor network configured to determine one or more parameters of the context of a user of the mobile computing device 100 or of the computing device 100 itself. For example, the sensors 130 may be embodied as any number of location sensors for determining the location of the user (e.g. GPS sensors), biometric sensors for determining biometric data of the user, temperature sensors, altitude sensors, radio frequency identification (RFID) transmitters and/or receivers, data scanners or readers, and/or other sensors and/or devices configured to sense or otherwise gather data indicative of a parameter of the context of the user (or the computing device 100 itself). Further, it should be appreciated that the computing device 100 may include other components, sub-components, and devices not illustrated in FIG. 1 for clarity of the description.

The enterprise SEM server 180 may be embodied as any type of enterprise-level security event management (SEM) system, security information management (SIM) system, or security event and information management (SEIM) system. The server 180 may include one or more computer server machines configured to receive security data from remote clients and/or other security event sources, aggregate the received security data, and correlate the security data for review by security personnel.

The enterprise SEM server 180 includes a processor 182, a memory 184, and communication circuitry 186. The processor 182 may be embodied as a single or multi-core processor. Additionally, the enterprise SEM server 180 may include any number of additional processors 182 having one or more processor cores. The memory 184 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), and/or other volatile memory devices. Although only a single memory device 184 is illustrated in FIG. 1, in other embodiments, the enterprise SEM server 180 may include additional memory devices 184. The communication circuitry 186 may be similar to the communication circuitry 122 of the mobile computing device 100 and may be embodied as any number of devices and circuitry for enabling communications between the enterprise SEM server 180 and the mobile computing device 100 over the network 160. Further, it should be appreciated that the enterprise security event management server 180 may include other components, sub-components, and devices typically found in an enterprise security event manager server, which are not illustrated in FIG. 1 for clarity of the description.

Figure 2:
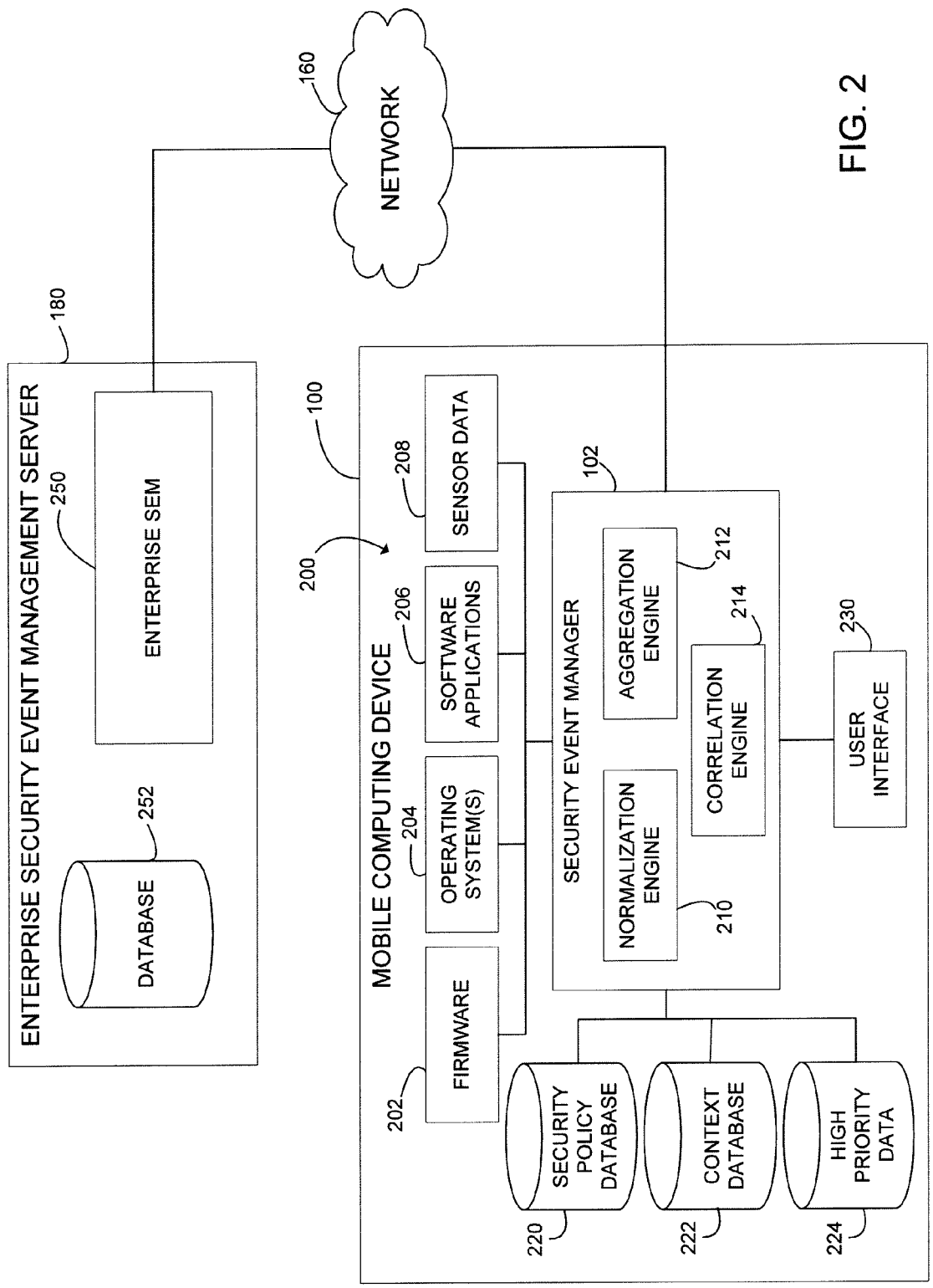
FIG. 2 is a simplified block diagram of a software environment of the mobile computing device of FIG. 1.

Referring now to FIG. 2, the mobile computing device 100 includes local security event manager 102 to provide an amount of security event management on the mobile computing device 100 itself, without the requirement of communicating with the enterprise SEM server 180. As discussed above, the security event manager 102 may be embodied as hardware, firmware, and/or software modules and devices. The security event manager 102 is configured to collect or otherwise receive security event data from one or more security event sources 200 of the mobile computing device.

The security event sources 200 may be embodied as any firmware, software, or hardware that generates security event data. For example, the security event sources 200 may be embodied as firmware 202 executed by one or more devices of the mobile computing device 100 such as processor firmware, firmware executed by peripheral devices, or other firmware executed by one or more components of the computing device 100. Additionally, the security event sources 200 may include one or more operating systems 204, which may generate security event data such as logs, activity reports, and/or the like. The security event sources 200 may further include software applications 206 executed on the operating systems 204. In embodiments in which the mobile computing device 100 includes sensors 130, the security event sources 200 may also include sensor data 208 generated by the sensor(s) 130.

The security event data generated by the security event sources 200 may be embodied as any type of data from which the occurrence of a security event may be determined. For example, the security event data may include event logs, activity reports or logs, error reports/logs, and/or other data generated from one or more security event sources 200. In response to receiving the security event data from the sources 200, the security event manager 102 is configured to normalize, aggregate, and correlate the security event data to determine whether a security event has occurred as discussed in more detail below. If a security event is determined to have occurred, the security event manager 102 may be configured to actively respond to such security events and/or provide information to a user via a user interface on the mobile computing device 100.

In the illustrative embodiment, the security event manager 102 includes a normalization engine 210, an aggregation engine 212, and a correlation engine 214. Each of the engines 210, 212, 214 may be embodied as separate firmware or software modules or may be incorporated in a single firmware and/or software module of the security event manager 102. As discussed above, the security event manager 102 receives security event data from the security event sources 200. The normalization engine 210 is configured to normalize the security event data received from the security event sources 200. To do so, the normalization engine 210 reformats the security event data into a common or otherwise predetermined data format. The particular data format used by the normalization engine 210 may be determined based on the particular implementation of the security event manager 102 and/or other criteria. Because the security event data is reformatted into a common format, the efficiency and speed at which the security event data is analyzed may be improved.

The aggregation engine 212 is configured to aggregate the normalized security event data to reduce the overall amount of data to be analyzed. In this way, the aggregation engine 212 summarizes the security event data. For example, if the security event data includes 1000 separate instances of a particular error, the aggregation engine 212 may be configured to represent such security event data as a single entry indicating that 1000 errors of the particular type were received within the analysis time window. Additionally or alternatively, the aggregation engine 212 may be configured to represent the security event data based on quantitative thresholds such that, in the example above, the 1000 error instances would be represented as a single error instance, which is generated from or defined as receiving 1000 instances of the particular error.

The correlation engine 214 is configured to correlate the aggregated security event data to determine the occurrence of a security event. To do so, the correlation engine 214 may correlate the security event data based on a predefined security policy, which may be stored in a security policy database 220. The security policy defines a set of security event rules used to identify security events from the security event data. The security event rules may have any format based on any type of criteria usable to determine a security event such as quantitative, temporal, qualitative, combinational, and/or other criteria. For example, one security event rule may indicate an occurrence of a security event if an event A and an event B occur within a predetermined time period from each other. Another security event rule may indicate a security event if the number of events C reaches a predetermined threshold. Additionally, another illustrative security event rule may indicate a security event if event D ever occurs. As such, the security policy may include any number of security policy rules having various forms from which the occurrence of a security event may be determined.

In some embodiments, the correlation engine 214 is configured to correlate the security event data based on the security policy and context data stored in a context database 222 of the mobile computing device 100. The context data may include any type of data that defines or otherwise identifies some context of the mobile computing device 100 and/or the user. For example, the context data may define a location of the mobile computing device 100, an activity being performed by the user, environmental aspects, biometric data of the user, historical data, and/or other context data. Such context data may have varying degrees of specificity. For example, in some embodiments, the location of the mobile computing device 100 may be defined as the city in which the device 100 is located, the building in which the device 100 is located, or the Global Positioning System (GPS) coordinates of the device 100. Regardless of the particular type and specificity of the context data, such data may be used with the security policy to determine the occurrence of a security event and/or how to respond to such an event as discussed in more detail below. For example, the occurrence of event A and event B may only define a security event if the mobile computing device 100 is in a particular location (e.g., at work).

The mobile computing device 100 may also include high priority data 224, which may be stored in a secure database or other memory storage location. Such high priority data may be embodied as especially sensitive data. To provide increased security for the high priority data, the security event manager 102 may be configured to store the high priority data in a separate secured virtual container. For example, the high priority data may be stored in a secured memory location. Such virtual containers allow for the transfer of sensitive data to and from the mobile computing device 100.

In some embodiments, the security event manager 102 may be configured to interact with a user interface 230 displayed on the mobile computing device 100. For example, the security event manager 102 may display warnings or updates based on the security event data to a user. Additionally, the user interface 230 may be used to request user input. For example, the user interface 230 may be used by a user to update the security policy stored in the security policy database 220 and/or the context data stored in the context database 222.

As discussed above, in some embodiments, the mobile computing device 100 may communicate with the enterprise security event management server 180 over the network 160. The enterprise security event management server 180 includes an enterprise security event manager 250, which may be embodied as a standard enterprise-level security event management (SEM) module, security information management (SIM) module, and/or security event and information management (SEIM) module in some embodiments. The enterprise security event manager 250 is configured to receive security event data from remote computing devices, such as the mobile computing device 100. Such security event data may be stored in a database 252. In use, the enterprise security event manager 250 is configured to aggregate and correlate the security event data received from the various remote computing devices for review by security personnel.

Figure 3:
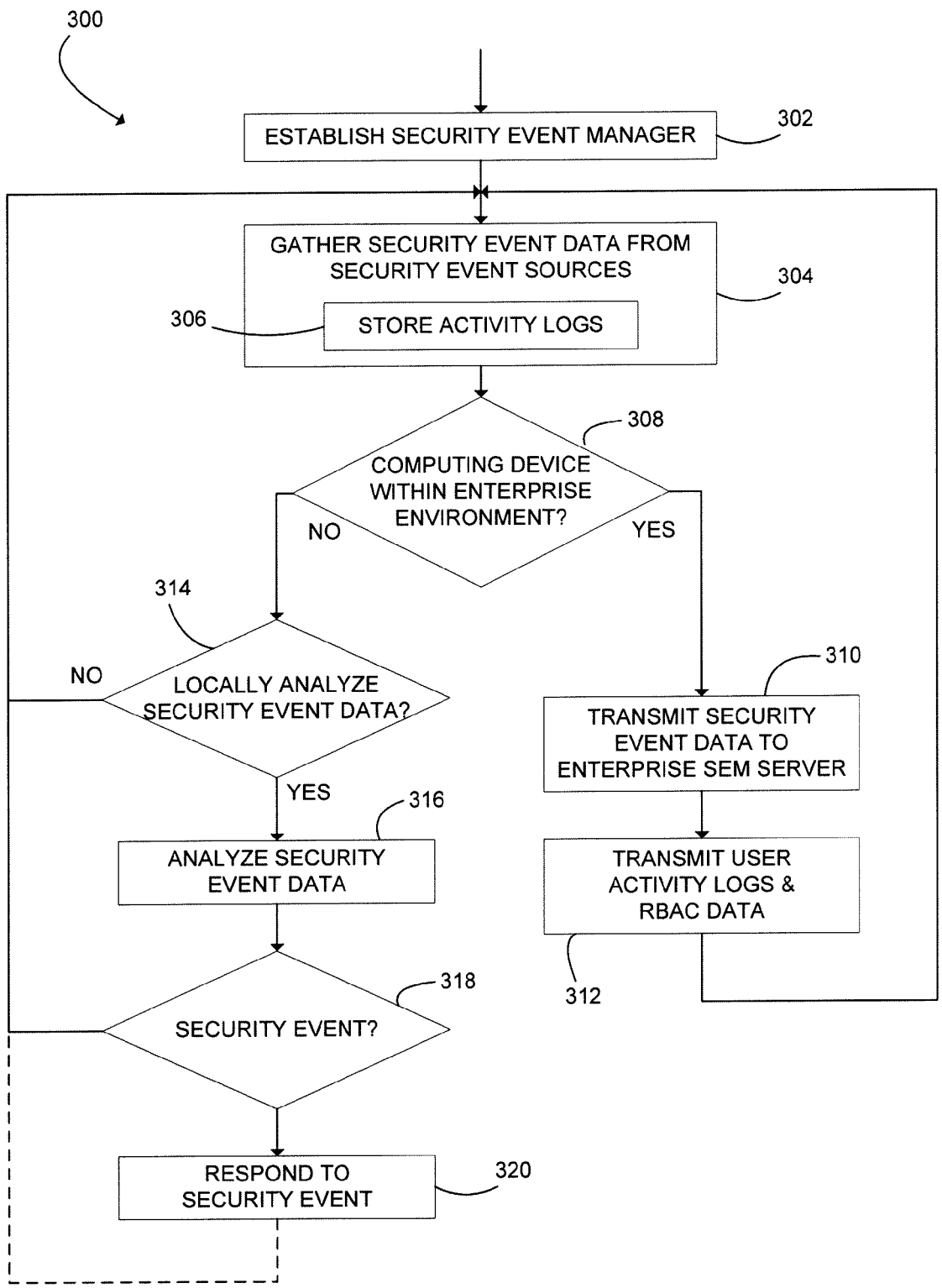
FIG. 3 is a simplified flow diagram of one embodiment of a method for managing security events executed by the mobile computing device of FIG. 1.

Referring now to FIG. 3, a method 300 for managing security events generated on the mobile computing device 100 begins with block 302 in which the security event manager 102 is initiated on the device 100. In some embodiments, the security event manager 102 is established in a secured environment. The security event manager 102 may be automatically initiated upon powering of the computing device 100. Alternatively, in other embodiments, the user of the mobile computing device 100 may selectively initiate the security event manager 102. Additionally, in some embodiments, the security event manager 102 may be configured to retrieve the security policy stored in the security policy database 220 and/or the context data stored in the context database 222 in block 302.

In block 304, the security event manager 102 collects or otherwise receives security event data generated by one or more security event sources 200 of the mobile computing device 100. As discussed above, the security event data may be embodied as any type of data from which the occurrence of a security event may be determined. For example, the security event data may include event logs, activity reports or logs, error reports/logs, and/or other data generated from one or more security event sources 200. Additionally, in some embodiments, the security event manager 102 may monitor and record the activity of the user of the mobile computing device 100 in block 306. Such activity logs may be used to ensure or monitor an enterprise's Role Based Access Control (RBAC). The activity monitored and logged by the security event manager 102 may include any type of activity performed on the computing device 100 such as usage information regarding applications and services of the device 100.

In block 308, the security event manager 102 determines whether the computing device 100 is within an enterprise environment. For example, the security event manager 102 may determine whether the device 100 is within the physical location of the enterprise (e.g., a particular room, building, or area). To do so, the security event manager 102 may use the context data stored in the context database 222. The specificity of such determination may vary depending on the particular implementation. For example, in some embodiments, the security event manager 102 is configured to determine whether the device 100 is communicatively coupled to the enterprise security event management server 180 in block 308, rather than a physical location.

If the security event manager 102 determines that the mobile computing device 100 is within the enterprise environment in block 308, the security event manager 102 transmits the security event data to the enterprise SEM server 180 in block 310. In some embodiments, the security event manager 102 may transmit "raw" security event data (i.e., security event data as received from the security event sources 200) to the server 180 in block 310. However, in other embodiments, the security event manager 102 may be configured to transmit aggregated, normalized security event data to the server 180 in block 310. Additionally, in block 312, the security event manager 102 transmits any activity logs or other Role Based Access Control (RBAC) data to the server 180. In this way, security event data and other information from many remote devices may be analyzed by the enterprise SEM server 180. The method 300 subsequently loops back to block 304 wherein additional security event data is received by the security event manager 102.

Referring back to block 308, if the security event manager 102 determines that the mobile computing device 100 is not within the enterprise environment, the security event manager 102 determines whether to analyze the security event data in block 314. The security event manager 102 may determine whether to analyze the security event data based on a periodic basis (e.g., the data is analyzed every hour) or based on one or more trigger events (e.g., a predetermined amount of security event data is received). Such trigger events may be defined by, for example, the security policy stored in the security policy database 220. Alternatively, in other embodiments, the security event manager 102 may analyze the security event data received from the security event sources 200 on a substantially continual basis. In such embodiments, the block 314 may be skipped or otherwise not included in the method 300.

Figure 4:
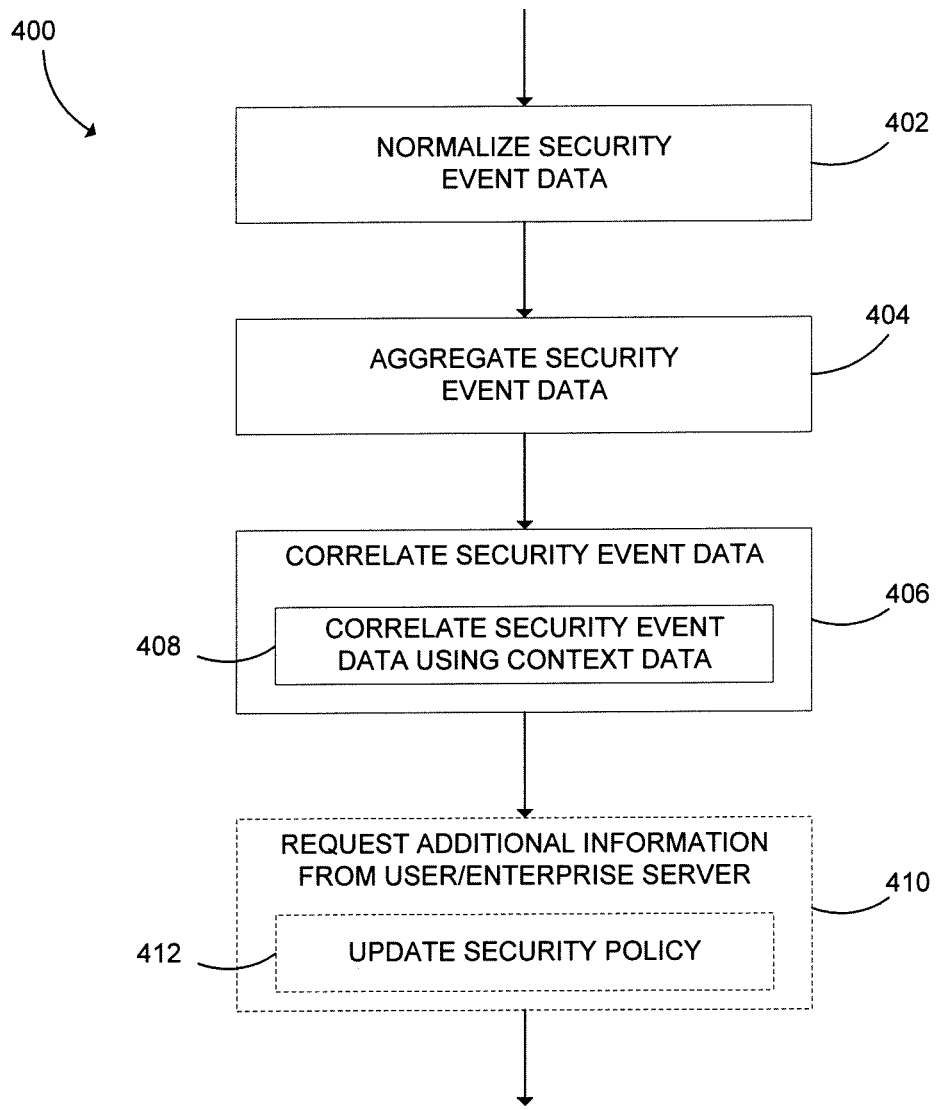
FIG. 4 is a simplified flow diagram of one embodiment of a method for analyzing security event data used in the method of FIG. 3.

If the security event manager determines that the security event data is to be reviewed, the security event manager 102 analyzes the security event data in block 316. To do so, the security event manager 102 may execute a method 400 for analyzing security event data as illustrated in FIG. 4. The method 400 begins with block 402 in which the security event data is normalized. As discussed above, the security event data may be normalized by the normalization engine 210 to reformat the security event data into a common or otherwise predetermined data format. The particular data format used by the normalization engine 210 may be determined based on the particular implementation of the security event manager 102 and/or other criteria.

In block 404, the aggregation engine 212 of the security event manager 102 aggregates the normalized security event data to summarize the normalized security event data such that the overall amount of data to be analyzed is reduced. The aggregation engine 212 may aggregate the security event data using any suitable methodology such as those based on quantitative thresholds or the like as discussed above in regard to FIG. 2. It should be appreciated that although the normalization and aggregation processes are embodied in the analysis of the security event data in block 316 of method 300, such normalization and aggregation processes may be performed in other processes of the method 300 in other embodiments. For example, in some embodiments, the security event data is normalized and aggregated upon receipt by the security event manager 102, periodically, or based on a predetermined trigger event.

Referring now to block 406 of the method 400, the correlation engine 214 of the security event manager 102 subsequently correlates the aggregated security event data to determine the occurrence of a security event. As discussed above, the correlation engine 214 may correlate the security event data based on the security policy stored in a security policy database 220. Additionally, in some embodiments, the correlation engine 214 is configured to correlate the security event data based on the security policy and context data stored in the context database 222 of the mobile computing device 100 in block 408. As such, the security event manager 102 may be configured to retrieve the context data from the context database 222 and use such data, along with the security event rules of the security policy, to correlate the security event data to thereby determine whether a security event has occurred.

In some embodiments, the security event manager 102 may be configured to prompt the user and/or the enterprise SEM server 180 for additional information regarding the security event data in block 410. Such additional information may be used to further determine whether a security event has occurred. For example, if a particular event is consistently received at a particular time of the day, the security event manager 102 may prompt the user to determine whether such event is a security threat or should be allowed. Additionally, the security event manager 102 may communicate with the server 180 to obtain similar or additional information.

In block 412, the security event manager 102 may be configured to update the security policy based on the additional information received in block 410. For example, if the user determines that the unknown event is not a security threat, the security policy may be updated to ignore the event when it occurs at that particular time of day (but classify the event as a security event if it occurs at a different time of day). In this way, the security policy and correlation of security event data may be modified over time to improve the security of the mobile computing device 100.

Referring now back to method 300 of FIG. 3, after analyzing the security event data in block 316, the security event manager 102 determines whether a security event has occurred in block 318. Such determination is based on the normalization, aggregation, and correlation of the security event data received from the security event sources 200 as discussed above. If no security event has occurred, the method 300 loops back to block 304 in which additional security event data is received from security event sources. However, if the security event manager determines that a security event has occurred, the security event manager 102 responds to the security event in block 320. The security event manager 102 may perform one or more actions in response to the determination that a security event has occurred including, for example, ignoring the security event, changing a connectivity state of the mobile computing device 100, modifying access to a software application, modifying data filters of the mobile computing device 100, denying access to data such as the high priority data 224, rebooting the mobile computing device 100, turning off the mobile computing device 100, quarantining a software application or service being executed on the mobile computing device 100, and/or any one or more additional actions. Depending on the particular action taken in response to the security event, the method 300 may subsequently loop back to block 304 in which additional security event data is received from the security event sources 200.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A method comprising:
    establishing a security event manager on a mobile computing device;
    receiving security event data with the security event manager, the security event data being generated on the mobile computing device by at least one security event source of the mobile computing device;
    transmitting the security event data to an enterprise security event manager server in response to determining that the mobile computing device is communicatively coupled to the enterprise security event manager server; and
    responding to the security event on the mobile computing device with the security event manager if the mobile computing device is not communicatively coupled to the enterprise security event manager server, wherein responding to the security event comprises:
    (i) retrieving security policy data with the security event manager, the security policy data defining a set of security event rules for determining the occurrence of a security event; and
    (ii) determining an occurrence of a security event with the security event manager based on the security event data and the security policy data by:
        normalizing, on the mobile computing device, the security event data to generate normalized security event data, the normalized security event data having a predetermined data format;
        aggregating, on the mobile computing device, the normalized security event data to generate aggregated security event data, the aggregated security event data summarizing the normalized security event data; and
        correlating, on the mobile computing device, the aggregated security event data to determine an occurrence of a security event based on the security policy data and on context data associated with the mobile computing device.

2. The method of claim 1, wherein establishing the security event manager comprises establishing the security event manager in a secured boot environment.

3. The method of claim 1, wherein receiving security event data comprises receiving security event data generated on the mobile computing device by a plurality of security event sources of the mobile computing device.

4. The method of claim 1, wherein receiving the security event data comprises receiving security event data generated from at least one of a firmware of the mobile computing device, an operating system of the mobile computing device, and a software application executed on the mobile computing device.

5. The method of claim 1, wherein the context data comprises data indicative of at least one of a location of a user of the mobile computing device, an activity of the user, an aspect of the environment in which the user is located, and biometric data related to the user.

6. The method of claim 1, further comprising:
retrieving the context data with the security event manager from a context database stored on the mobile computing device if the mobile computing device is not communicatively coupled to the enterprise security event manager server.

7. The method of claim 1, wherein responding to the security event comprises performing at least one of the following actions on the mobile computing device: changing a connectivity state of the mobile computing device, modifying access to a software application on the mobile computing device, modifying an event data filter of the security event manager, denying access to data, rebooting the mobile computing device, modifying a power state of the mobile computing device, and quarantining a software application or service executed on the mobile computing device.

8. The method of claim 1, further comprising:
receiving sensor data generated from a sensor of the mobile computing device; and
updating a context database stored on the mobile computing device with the sensor data.

9. The method of claim 1, further comprising:
displaying a user interface on the mobile computing device to receive user input data; and
updating the security policy data based on the user input data.

10. The method of claim 1, further comprising:
establishing a network communication connection with an enterprise security event manager server; and
transmitting the security event data from the mobile computing device to the enterprise security event manager server.

11. The method of claim 1, wherein the context data identifies a location of the mobile computing device.

12. The method of claim 11, wherein the context data identifies a building in which the mobile computing device is located.

13. The method of claim 11, wherein the context data identifies global positioning system coordinates at which the mobile computing device is located.

14. A mobile computing device comprising:
a security event manager;
a processor; and
a memory device having stored therein a plurality of instructions, which when executed by the processor, cause the security event manager to:
receive security event data generated on the mobile computing device from a plurality of security event sources of the mobile computing device;
transmit the security event data to an enterprise security event manager server in response to a determination that the mobile computing device is communicatively coupled to the enterprise security event manager server; and
respond to a security event on the mobile computing device with the security event manager if the mobile computing device is not communicatively coupled to the enterprise security event manager server, wherein to respond to the security event comprises to:
normalize, on the mobile computing device, the security event data to generate normalized security event data, the normalized security event data having a predetermined data format;
aggregate, on the mobile computing device, the normalized security event data to generate aggregated security event data, the aggregated security event data summarizing the normalized security event data; and
correlate, on the mobile computing device, the aggregated security event data based on a security policy and on context data associated with the mobile computing device to determine an occurrence of a security event, the security policy being stored on the mobile computing device and defining a set of security event rules for determining the occurrence of a security event.

15. The mobile computing device of claim 14, wherein to correlate the security event data comprises to determine an occurrence of a security event in response to the security event data having a predetermined relationship with at least one security event rule of the security policy.

16. The mobile computing device of claim 14, wherein the context data is related to a user of the mobile computing device, and wherein the plurality of instructions further cause the security event manager to retrieve the context data from a context database stored on the mobile computing device.

17. The method of claim 16, wherein the context data identifies at least one of an activity being performed by the user or biometric data of the user.

18. The mobile computing device of claim 14, further comprising a sensor and wherein the plurality of instructions further cause the security event manager to:
receive sensor data generated from the sensor, and
update a context database stored on the mobile computing device with the sensor data.

19. The mobile computing device of claim 14, wherein the plurality of instructions further cause the security event manager to:
establish a network communication connection with an enterprise security event manager server; and
transmit the security event data from the mobile computing device to the enterprise security event manager server.

20. A non-transitory machine-readable storage medium comprising a plurality of instructions, that in response to being executed, result in a mobile computing device:
establishing a security event manager on the mobile computing device;
receiving security event data with the security event manager, the security event data being generated on the mobile computing device by a plurality of security event sources of the mobile computing device;
transmitting the security event data to an enterprise security event manager server in response to determining that the mobile computing device is communicatively coupled to the enterprise security event manager server; and
responding to a security event on the mobile computing device with the security event manager if the mobile computing device is not communicatively coupled to the enterprise security event manager server, wherein responding to the security event comprises:
(i) normalizing the security event data, using the security event manager on the mobile computing device, to generate normalized security event data, the normalized security event data having a predetermined data format;
(ii) aggregating the normalized security event data, using the security event manager on the mobile computing device, to generate aggregated security event data, the aggregated security event data summarizing the normalized security event data; and (iii) correlating the aggregated security event data based on a predetermined security policy and on context data associated with the mobile computing device, using the security event manager on the mobile computing device, to determine whether a security event has occurred.

21. The non-transitory machine-readable storage medium of claim 20, wherein correlating the aggregated security event data comprises determining whether the security event data has a predetermined relationship with at least one security event rule defined by the predetermined security policy.

22. The non-transitory machine-readable storage medium of claim 20, wherein the plurality of instructions further result in the computing device responding to a security event based on the predetermined security policy.

* * * * *